US012625953B2

(12) United States Patent
Chen et al.

(10) Patent No.: US 12,625,953 B2
(45) Date of Patent: May 12, 2026

(54) ADAPTIVE META-ATTACK SYSTEM AND METHOD FOR TARGET TRACKER UNDER AUTONOMOUS DRIVING SCENARIOS

(71) Applicant: HANGZHOU DIANZI UNIVERSITY, Hangzhou (CN)

(72) Inventors: Yuanfang Chen, Hangzhou (CN); Sihang Ma, Hangzhou (CN); Xing Fang, Hangzhou (CN); Xiaohan Chen, Hangzhou (CN); Jie Xiong, Hangzhou (CN); Xiajun He, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 62 days.

(21) Appl. No.: 18/825,004

(22) Filed: Sep. 5, 2024

(65) Prior Publication Data

US 2024/0427885 A1    Dec. 26, 2024

(30) Foreign Application Priority Data

Mar. 29, 2024    (CN) ......................... 202410373108.9

(51) Int. Cl.
| | |
|---|---|
| *H04L 29/06* | (2006.01) |
| *G06F 21/55* | (2013.01) |
| *G06T 7/246* | (2017.01) |
| *G06V 10/766* | (2022.01) |
| *G06V 10/77* | (2022.01) |
| *G06V 10/774* | (2022.01) |
| *G06V 10/776* | (2022.01) |
| *G06V 20/56* | (2022.01) |

(52) U.S. Cl.
CPC ............ *G06F 21/554* (2013.01); *G06T 7/246* (2017.01); *G06V 10/766* (2022.01); *G06V 10/7715* (2022.01); *G06V 10/774* (2022.01); *G06V 10/776* (2022.01); *G06V 20/56* (2022.01); *G06F 2221/034* (2013.01); *G06T 2207/10016* (2013.01); *G06T 2207/20081* (2013.01); *G06T 2207/30252* (2013.01)

(58) Field of Classification Search
CPC .......... G06F 21/55; G06T 7/246; G06V 10/77
See application file for complete search history.

(56) References Cited

U.S. PATENT DOCUMENTS

| | | | | |
|---|---|---|---|---|
| 11,315,343 B1* | 4/2022 | Pei | ......................... | G06F 17/13 |
| 2017/0063911 A1* | 3/2017 | Muddu | ................ | H04L 41/145 |

(Continued)

FOREIGN PATENT DOCUMENTS

| | | |
|---|---|---|
| CN | 111627044 A | 9/2020 |

*Primary Examiner* — Wasika Nipa

(57) ABSTRACT

An adaptive meta-attack system for target trackers under autonomous driving scenarios including an initialization module, a meta-training iteration module, a meta-testing module, a perturbation generator, and an inference module. The initialization module includes a model initialization sub-module and a parameter initialization sub-module. The meta-training iteration module includes a video input sub-module, a training-validation model division sub-module, and a meta-training sub-module. The meta-testing module includes a performance validation and evaluation sub-module and a parameter output sub-module. An adaptive meta-attack method for a target tracker under autonomous driving scenarios applied in the adaptive meta-attack system is further provided.

7 Claims, 1 Drawing Sheet

(56) References Cited

U.S. PATENT DOCUMENTS

| | | | |
|---|---|---|---|
| 2020/0134468 A1* | 4/2020 | Ding | G06N 3/048 |
| 2020/0358800 A1* | 11/2020 | Bisht | H04L 63/1425 |
| 2022/0138584 A1* | 5/2022 | Cintas | G06N 3/08 |
| | | | 706/20 |
| 2022/0292311 A1* | 9/2022 | Song | G06V 10/454 |
| 2023/0214663 A1* | 7/2023 | Kumar | G06N 3/0464 |
| | | | 382/155 |

* cited by examiner

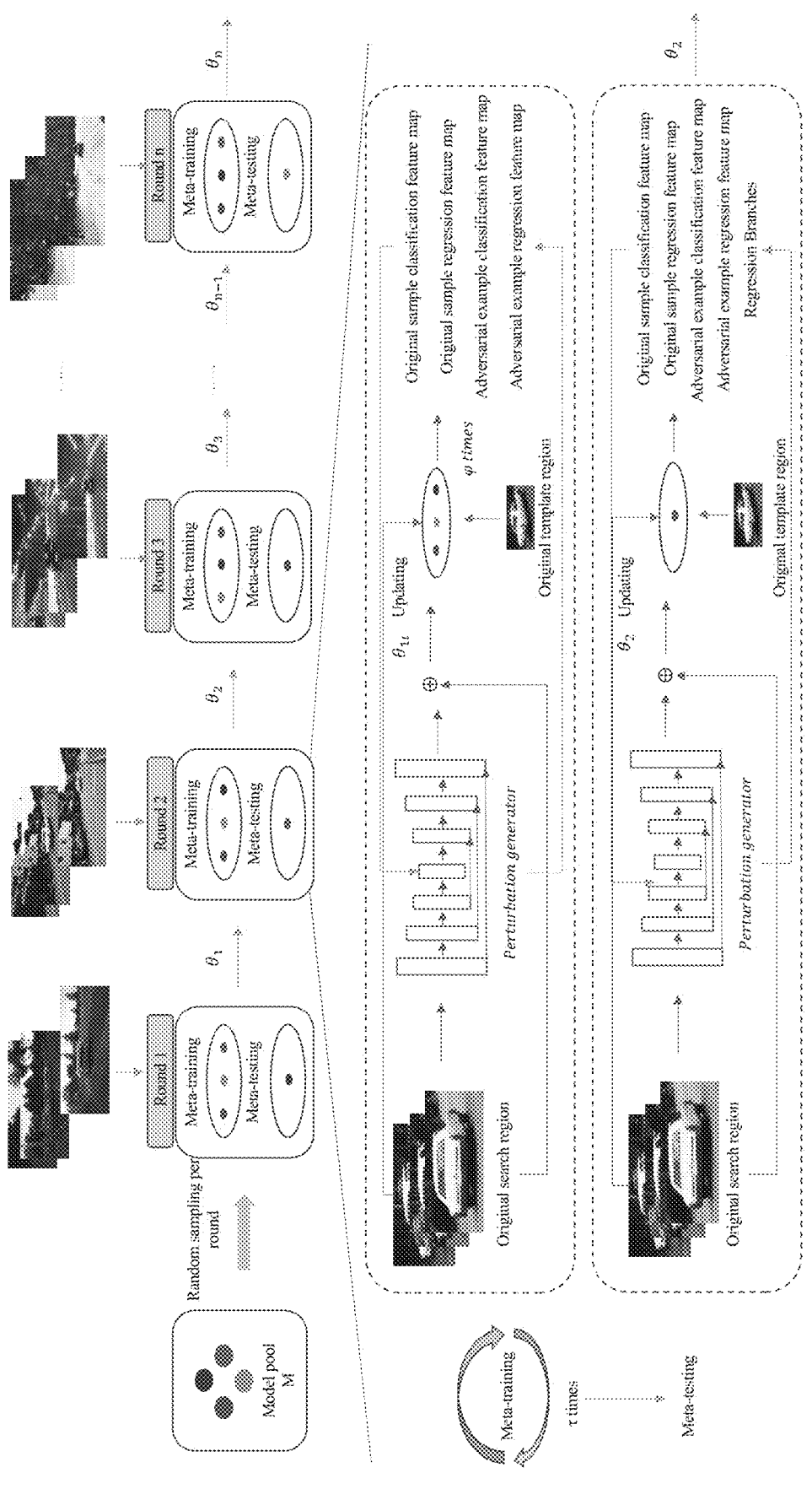

ADAPTIVE META-ATTACK SYSTEM AND METHOD FOR TARGET TRACKER UNDER AUTONOMOUS DRIVING SCENARIOS

CROSS-REFERENCE TO RELATED APPLICATIONS

This application claims the benefit of priority from Chinese Patent Application No. 202410373108.9, filed on Mar. 29, 2024. The content of the aforementioned application, including any intervening amendments thereto, is incorporated herein by reference in its entirety.

TECHNICAL FIELD

This application relates to autonomous driving and machine vision-based target tracking, and more particularly to an adaptive meta-attack system and method for target trackers under autonomous driving scenarios.

BACKGROUND

In the digital age, the intelligent driving systems are challenged by adversarial attacks. These adversarial attacks may cause the autonomous driving system to make wrong decisions, increasing the risk of traffic accidents. As a key part of the intelligent driving systems, the visual target tracking technique can help the intelligent driving systems recognize and track various objects on the road. However, the adversarial attacks can interfere with these tracking systems to lead to incorrect target tracking or tracking failures, thus threatening the safety and stability of intelligent vehicles. To address this challenge, researchers have proposed adversarial attack algorithms to promote the understanding and improve the attack effectiveness and generalization performance of adversarial examples. The current researches mainly focus on white-box attack, black-box attack, and semi-white-box attack. Among them, the semi-white-box attack is considered as an effective method due to its good adaptability and balance in designing attack strategies in the case of limited model information. Target tracking algorithms mainly rely on deep learning. With the popularization of the Transformer model, it will inevitably play a dominant role in the automatic driving, and the current visual target tracking is mainly based on the Transformer framework instead of the Siamese network. However, different algorithms have different structures and principles, which lead to some limitations in the study of attacks against specific trackers.

To address the shortcomings of the existing attack methods, a method for enhancing adversarial attacks against target tracking systems in the autonomous driving has been developed, which can improve the attack effectiveness and generalization performance of adversarial examples in complex autonomous driving scenarios by generating adversarial examples with high efficiency and effectiveness and strong generalization performance through deep analysis. This research contributes to the enhancement of the defense capability of target tracking systems against adversarial attacks and the development of adversarial defense techniques.

SUMMARY

This application aims to address the adversarial attack problems faced by visual tracking in autonomous driving systems, including the emergence of adversarial examples, insufficient generalization capability, and balance between effectiveness and speed. With the development of the autonomous driving technology, the threat suffered by the visual tracking system from adversarial examples is increasingly serious. The adversarial examples are specially-designed input data that can deceive the tracking system, and thus can cause the system to produce incorrect recognition and tracking results, thus affecting the performance and safety of the entire autonomous driving system. The traditional adversarial attack methods have insufficient generalization capability, such that the attack strategy may be effective only for a specific tracker model, and fails to adapt to various tracker structures and characteristics. The adversarial attack methods need to ensure the attack effectiveness while minimizing the impact on the performance and speed of the tracking system, so as to ensure the real-time performance and stability of the autonomous driving system.

The technical solutions of the present application are as follows.

This application provides an adaptive meta-attack system for a target tracker under an autonomous driving scenario, comprising an initialization module, a meta-training iteration module, a meta-testing module, a perturbation generator, and an inference module;

wherein the initialization module comprises a model initialization sub-module and a parameter initialization sub-module; the model initialization sub-module is configured to perform model initialization, and the parameter initialization sub-module is configured to perform parameter initialization;

the meta-training iteration module comprises a video input sub-module, a training-validation model division sub-module, and a meta-training sub-module;

the meta-testing module comprises a performance validation and evaluation sub-module and a parameter output sub-module;

the meta-training iteration module is configured to train the perturbation generator through multiple iterations by using a video dataset input by the video input sub-module to obtain a trained perturbation generator; the meta-testing module is configured to perform performance validation and evaluation on the trained perturbation generator; and the inference module is configured to attack a video by using the trained perturbation generator.

This application further provides an adaptive meta-attack method for a target tracker under an autonomous driving scenario using the above adaptive meta-attack system, comprising:

(a) constructing, by the model initialization sub-module, a tracker model pool M={M1, M2 . . . , Mn} with a diversified network structure; initializing, by the model initialization sub-module, the tracker model pool; and performing, by the parameter initialization sub-module, parameter initialization of the perturbation generator; wherein the tracker model pool M is configured to construct a meta-training model pool N and a meta-testing model E to make the perturbation generator adaptive to different trackers; and a parameter of the perturbation generator is 0 output from a previous training process; and random parameters are used in a first training;

(b) extracting, by the video input sub-module, a video from the video dataset for sampling, and extracting 1 frame from every 10 frames to constitute a training image for a current round;

3

(c) randomly selecting, by the training-validation model division sub-module, one tracker model from the tracker model pool M to construct the meta-testing model E; wherein remaining tracker models in the tracker model pool M are configured as the meta-training model pool N;

(d) performing, by the meta-training sub-module, random sampling in the meta-training model pool N to construct a tracker model group S; inputting a search region into the perturbation generator to generate an adversarial example in a training process; and computing a dual-confidence balance optimization loss function $L_c$ and a peripheral attack regression loss function $L_r$ generated by each of tracker models in the tracker model group S; and performing weighted ensemble on the dual-confidence balance optimization loss function $L_c$ and the peripheral attack regression loss function $L_r$, and performing model optimization on the perturbation generator by back propagation;

(e) repeating step (d) $\varphi$ times, and outputting a parameter $\theta_1$;

(f) loading the parameter $\theta_1$ by the perturbation generator; performing performance test, by the performance validation and evaluation sub-module, on the perturbation generator trained each time by the meta-training sub-module, wherein a tracker model used by the performance validation and evaluation sub-module is the meta-testing model E;

(g) outputting, by the parameter output sub-module, a parameter $\theta_2$ of the perturbation generator in the current round;

(h) executing step (b), and repeating training for $\tau$ times; and taking a parameter of the perturbation generator after last training as a final parameter; and (i) loading, by the inference module, the final parameter of the perturbation generator to generate perturbation and superimpose the perturbation onto an original search image to generate an adversarial example in an inference process, thereby deceiving the target tracker.

In an embodiment, in the step (c), "dividing the meta-testing model and the meta-training model" is performed through steps: in each meta-training iteration, randomly selecting, by the training-validation model division sub-module, the one tracker model from the tracker model pool M to construct the meta-testing model E; wherein the remaining tracker models in the tracker model pool M are configured as the meta-training model pool N; Through this division, the mechanism of meta-training and meta-testing is used to assess and improve the generalization ability of the model, and to enhance the adaptability of the model to the new scene.

In an embodiment, in the step (d), a meta-training algorithm is performed by the meta-training sub-module through the following steps:

(d1) random sampling combination: performing the random sampling in the meta-training model pool N to construct the tracker model group S, thereby enhancing diversity and complexity of training models obtained from the initialization module;

(d2) perturbation generation: performing a multi-task training on the tracker model group S; and transmitting the original search image frame by frame to the perturbation generator to generate the adversarial example;

(d3) feature map acquisition: inputting the adversarial example and an original example into the tracker model group S to obtain a feature map of each of the tracker models in the tracker model group S, and analyzing a difference between the adversarial example and the original example and deceiving the tracker model in the tracker model group S; and $$X_t^h, X_t^a \Rightarrow S \Rightarrow \begin{cases} R_s^h, C_s^h = R(X_t^h; \theta), C(X_t^h; \theta), \\ R_s^a, C_s^a = R(X_t^a; \theta), C(X_t^a; \theta), \end{cases} \forall s \in S, t \in T; \quad (1)$$

$$P_s^h = softmax(C_s^h)$$

$$P_s^a = softmax(C_s^a)$$

in the formula (1), t represents/frames of a video stream;

$$X_t^a$$

represents an adversarial example generated after application of adversarial perturbation on frame t; R represents generation of a prediction box boundary; C represents a regression loss of the tracking process;

$$R_s^a$$

and $$R_s^h$$

represent the regression feature maps of the adversarial example and the original example, respectively;

$$C_s^a$$

and $$C_s^h$$

represent classification feature maps of the adversarial example and the original example; and $$P_s^a$$

and $$P_s^h$$

represent probability feature maps transformed by softmax on the classification feature maps which represent the relative confidence that the target occurs at the position;

(d4) calculating and weighting integrated loss function and performing model optimization by backpropagation: taking the adversarial example

5 and the original example $$X_t^a$$

$$X_t^h$$

respectively as input images of the tracker models in the tracker model group S to obtain regression feature maps $$R_s^a$$

and $$R_s^h$$

generated by each of the tracker models; calculating, based on the regression feature maps $$R_s^a$$

and $$R_s^h,$$

the classification feature maps $$C_s^a$$

and $$C_s^h,$$

and the probability feature maps $$P_s^a$$

and $$P_s^h$$

created by softmax, the dual-confidence balance optimization loss function $L_c$ and the peripheral attack regression loss function $L_r$; and weighting and summing the dual-confidence balance optimization loss function $L_c$ and the peripheral attack regression loss function $L_r$ to obtain a combined loss, and updating model parameters of the perturbation generator by back propagation.

In an embodiment, in the step (d), a training algorithm for the perturbation generator in the meta-training sub-module is performed through the following steps:

(d-1) randomly selecting the one tracker model from the tracker model pool M as the meta-testing model $E\{M_e\}$, and taking the remaining tracker models in the tracker model pool M as the meta-training model pool $N=\{M_1, M_2, \ldots, M_j \ldots, M_n\}$ ($e \neq j$); and performing the random sampling in the meta-training model pool N to construct the tracker model group $S=\{(M_a, M_b | M_a, M_b \in F, a \neq b\};$ (d-2) producing, by a perturbation generator G, a perturbation image $P:G(X_t) \Rightarrow P$; generating the adversarial example $$P + X_t^h = X_t^a$$

corresponding to the search region; based on the adversarial example and an original example, generating regression feature maps $$R_s^a$$

and $$R_s^h,$$

classification feature maps $$C_s^a$$

and $$C_s^h$$

and probability feature maps $$P_S^a$$

and $$P_s^h$$

respectively of each of tracker models in the tracker model group S; calculating the loss function $L_s = \alpha L_1 + \beta L_c + \gamma L_r$, $\forall f \in F$; and weighting and summing each loss function to obtain $$L_{total} = \frac{1}{|s|} \sum_{i=0}^{|S|} L_i;$$

and (d-3) updating generator parameter $\theta_1$.

In an embodiment, in the step (d), the dual-confidence balance optimization loss function $L_c$ is expressed as:

$$L_{C_{high}}\left(P_m^a, P_m^h, C_m^a\right) = \qquad (2)$$

$$\frac{1}{H}\sum_{H=P_m^h > \delta}\left(\begin{array}{c}\lambda_1 BCE(P_m^a[A], \text{zero}) \\ \pm\lambda_2\left(C_m^a[H][:0] - C_m^a[H][:1]\right)\end{array}\right) * \left(P_m^h\right)^2$$

$$L_{C_{blow}}\left(P_m^a, P_m^h, C_m^a\right) = \qquad (3)$$

$$\frac{1}{L}\sum_{L=Sort(\vartheta < P_m^h < \zeta)}\left(\begin{array}{c}\lambda_3 BCE(P_m^a[L[:1.5H]], \text{one}) \\ \pm\lambda_4\left(C_m^a[L[:1.5H]][:0] - C_m^a[L:1.5H][:1]\right)\end{array}\right) *$$

$$\left(P_m^h\right)^2;$$

$$L_c = \lambda_5 * L_{C_{high}} + \lambda_6 * L_{C_{blow}}. \qquad (4)$$

and

In above formulas, three threshold values are set in the dual-confidence equilibrium optimization loss function $L_c$; $\delta$ represents a high confidence threshold; $\zeta$ represents a medium confidence threshold; $\vartheta$ represents a low confidence threshold; m represents a certain tracker; h represents an original example; $\alpha$ represents the adversarial example; P represents the probability feature map generated by softmax on the classification feature map; C represents the classification feature map; BCE represents a binary cross-entropy formula; H represents an index of a confidence region with $$P_m^h > \delta; \lambda_1, \lambda_2, \lambda_3, \lambda_4, \lambda_5, \text{ and } \lambda_6$$

represent weights of individual weight coefficients;

$$P_m^h$$

represents a probability feature map generated by an original example transfer tracker m;

$$P_m^a$$

represents a probability feature map generated by an adversarial example transfer tracker m;

$$C_m^a$$

represents a classification feature map generated by the adversarial example transfer tracker m; $L_{C_{high}}$ represents a loss function of a high confidence region; and $L_{C_{blow}}$ represents a loss function of a low confidence region. The high confidence region is greater than $\delta$, generally 0.6. The low confidence region is less than $\delta$, generally 0.1. In order to guide the adversarial attack to target both the high-confidence region and the low-confidence region, the attack strength is effectively enhanced.

In an embodiment, two-part function is designed. Firstly, a loss function $L_{C_{high}}$ is defined for regions of higher confidence to reduce the confidence scores within these regions. Correspondingly, a loss function $L_{C_{blow}}$ is defined for regions of lower confidence to enhance the confidence scores. A dual strategy optimizes the effect of the adversarial attack. The loss function $L_{C_{high}}$ uses binary cross-entropy (BCE) to evaluate the difference between the confidence H of regions $$P_m^a$$

higher than $\delta$ and zero, so that the value of the high confidence region is transformed towards zero. A constraint term is added to eliminate the difference between the foreground and background scores of the high confidence region. $L_{C_{blow}}$ makes the value of the low confidence region L tends to be close to 1 and reduces the differentiation of the foreground and background scores. The definition of low confidence intervals is not simply to use all the values less than $\zeta$. The region at the edges is not favourable to attack due to its susceptibility to the Hamming window. The range is therefore limited to a more detailed interval $[\vartheta,\zeta]$ and sorted to select that greater than 1.5 times H. By balancing the number of high-confidence and low-confidence prediction boxes in this way, the focus is put on the regions that are easy to attack, which in turn enhances the attack ability of the algorithm. At the same time, inspired by the idea of focal loss, the difficulty of the samples is adjusted, and ultimately multiplied by $$P_m^h.$$

The adaptive optimization of the confidence level of each channel, so that the channel with a higher confidence level or channel with a lower confidence level have a greater weight, and the closest region and the region that deviates the farthest from the real target are focused.

In an embodiment, in the step (d), the peripheral attack regression loss function $L_r$ is expressed as:

$$L_r\left(R_m^h, R_m^a, P_m^h\right) = \frac{1}{H}\sum_{H=P_m^h > \delta}\lambda_7 giou\left(R_m^h[H], R_m^a[H]\right). \qquad (5)$$

In above formula, $L_r$ represents the peripheral attack regression loss function; R represents generation of a prediction box boundary;

$$R_m^a$$

represents a prediction box boundary generated by an adversarial example transfer tracker m;

$$R_m^h$$

represents a prediction box boundary generated by an original example transfer tracker m; m represents a certain tracker; h represents an original example; $\delta$ represents a high confidence threshold; H represents an index of a confidence region with $$P_m^h > \delta;$$

$\lambda_7$ represents a weight coefficient;

$$P_m^h$$

represents a probability feature map generated by the original example transfer tracker m;

$$R_m^a[H]$$

represents a regression feature map generated by a tracker model in the tracker model pool M after experiencing an adversarial attack within a confidence range of $[\delta, 1]$, which reflects a position of a prediction box; and $$R_m^h[H]$$

represents a regression feature map corresponding to a highest confidence determined by the tracker model in the tracker model pool M within an unattacked search region.

In the peripheral attack regression loss function $L_r$, R represents generation of prediction box boundaries.

$$R_m^a$$

represents a prediction box boundary generated by the adversarial example transfer tracker m; and $$R_m^h$$

represents a prediction box boundary generated by the original example transfer tracker m. During the tracking process, the intersection-over-Union (IoU) ratio between the prediction box and the real frame exhibits a low value, which usually indicates that the prediction box at this position is not suitable as the final tracking result. Compared to IoU, Generalized IoU (GIOU) has a more significant improvement. Even when the prediction box is completely off-target, GIOU is still able to effectively measure the offset gap between the prediction box and the real target. As the relative distance between the prediction box and the real target increases, the GIOU value increases accordingly, which can guide the tracker prediction results away from the actual target position. In this disclosure, H represents the index of the confidence region with $$P_m^h > \delta;$$

$\lambda_7$ represents the weight coefficient; $\delta$ represents the high confidence threshold;

$$R_m^a[H]$$

represents the regression feature map generated by the tracker model in the tracker model pool M after experiencing the adversarial attack within the confidence range of $[\delta, 1]$, which reflects the position of the prediction box. Instead, $$R_m^h[H]$$

represents the regression feature map corresponding to the highest confidence determined by the tracker model in the tracker model pool M within the unattacked search region. This treatment may cause the prediction box to be significantly shifted or even reduced, such that in the following frames, the search region may no longer contain the position of the real target, thereby purposefully generating adversarial examples, effectively disrupting the performance of the tracker model, and enhancing the vulnerability of the tracker model when faced with adversarial perturbations.

In an embodiment, in the step (f), an algorithm for performance validation and evaluation is performed through the following steps:

performance validation and evaluation: applying a meta-training strategy in a meta-training phase to the performance validation and evaluation sub-module; inputting the adversarial example $$X_t^a$$

and an original example $$X_t^h$$

to the meta-testing model E to obtain the regression feature map, the classification feature map, and the probability feature map (feature map (6)) to test generalization ability of the perturbation generator for tracker models in the meta-testing model E, and to evaluate and guide an optimization direction of the perturbation generator.

The feature map (6) is expressed as:

$$X_t^h, X_t^a \Rightarrow E \Rightarrow \begin{cases} R_e^h, C_e^h = R(X_t^h; \theta), C(X_t^h; \theta), \\ R_e^a, C_e^a = R(X_t^a; \theta), C(X_t^a; \theta), \end{cases} \forall\, e \in E, t \in T. \qquad (6)$$

$$P_e^h = softmax(C_s^h)$$

$$P_e^a = softmax(C_s^a)$$

In the formula (6), t represents t frames of the video stream;

$$X_t^a$$

represents the adversarial example; R represents a classification loss of a tracking process; C represents a regression loss of the tracking process;

11                                                            12

$$R_e^a$$

and $$R_e^h$$

represent the regression feature map of the adversarial example and the original example, respectively;

$$C_e^a$$

and $$C_e^h$$

represent the classification feature map of the adversarial example and the original example;

$$P_e^a$$

and $$P_e^h$$

represent the probability feature map transformed by the softmax of the classification feature map which represents the relative confidence that the target occurs at the position. Note: e and s as subscripts represent tracker models in the meta-testing model E and the tracker model group S, respectively.

In an embodiment, in the step (d), an algorithm for the perturbation generator in the meta-training module is performed through the following steps:

(7-1) generating a perturbation image P:G $(X_t) \Rightarrow$P by the perturbation generator G;

(7-2) generating the adversarial example $$P + X_t^h = X_t^a$$

corresponding to the search region;

(7-3) based on the formula (6), inputting the adversarial example into the meta-testing model E to generate the classification feature map and the probability feature map;

(7-4) calculating the loss function $L_e = \alpha L_1 + \beta L_c + \gamma L_R$, $\forall e \in$ E; and (7-5) performing generator parameter $\theta_2$ of the perturbation generator.

This application has the following beneficial effect.

This application enhances the generalization and attack strength of the adversarial attack model in the visual target tracking task.

A novel dual-confidence equilibrium optimization loss function and a peripheral attack regression loss function accurately and efficiently destroys the target track system. This application can generalize the adversarial attack for multiple tracker models, improve the applicability of the adversarial attack for different tracker models, and enhance the threat of the visual target tracking model.

BRIEF DESCRIPTION OF THE DRAWINGS

FIGURE shows a flowchart of a meta-attack method for a target tracker under an autonomous driving scenario according to an embodiment of the present disclosure.

DETAILED DESCRIPTION OF EMBODIMENTS

The present disclosure will be further described below in conjunction with the accompanying drawings. The embodiments are only used to illustrate the technical solution of the present disclosure more clearly, which are not intended to limit the disclosure.

An adaptive meta-attack system for target trackers under autonomous driving scenarios provided herein includes an initialization module, a meta-training iteration module, a meta-testing module, a perturbation generator, and an inference module.

The initialization module includes a model initialization sub-module and a parameter initialization sub-module. The model initialization sub-module is configured to perform model initialization, and the parameter initialization sub-module is configured to perform parameter initialization.

The meta-training iteration module includes a video input sub-module, a training-validation model division sub-module, and a meta-training sub-module.

The meta-testing module includes a performance validation and evaluation sub-module and a parameter output sub-module.

The meta-training iteration module is configured to train the perturbation generator through multiple iterations by using a video dataset input by the video input sub-module to obtain a trained perturbation generator. The meta-testing module is configured to perform performance validation and evaluation on the trained perturbation generator.

The inference module is configured to attack a video by using the trained perturbation generator.

An adaptive meta-attack method for a target tracker under an autonomous driving scenario using the adaptive meta-attack system above is further provided in this disclosure. As shown in FIGURE, the adaptive meta-attack method includes the following steps.

(1) The model initialization sub-module constructs a tracker model pool M={M1, M2 . . . , $M_n$} with a diversified network structure. The model initialization sub-module initializes the tracker model pool. The parameter initialization sub-module performs parameter initialization of the perturbation generator. The tracker model pool M is configured to construct a meta-training model pool N and a meta-testing model E to make the perturbation generator adaptive to different trackers. A parameter of the perturbation generator is 0 output from a previous training process. Random parameters are used in a first training.

(2) The video input sub-module extracts a video from the video dataset for sampling and extracts 1 frame from every 10 frames to constitute a training image for a current round.

(3) The training-validation model division sub-module randomly selects one tracker model from the tracker model pool M to construct the meta-testing model E.

Remaining tracker models in the tracker model pool M are configured as the meta-training model pool N.

(4) The meta-training sub-module performs random sampling in the meta-training model pool N to construct a tracker model group S. A search region is input into the perturbation generator to generate an adversarial example in a training process as the input image data for the tracker model group S. A dual-confidence balance optimization loss function $L_c$ and a peripheral attack regression loss function $L_r$ generated by each of tracker models in the tracker model group S are computed. Weighted ensemble is performed on the dual-confidence balance optimization loss function $L_c$ and the peripheral attack regression loss function $L_r$, and model optimization is performed on the perturbation generator by back propagation.

(5) Repeat step (4) $\varphi$ times and output the parameter $\theta_1$.

(6) The parameter $\theta_1$ is loaded by the perturbation generator. The performance validation and evaluation sub-module performs performance test on the perturbation generator trained each time by the meta-training sub-module. A tracker model used by the performance validation and evaluation sub-module is the meta-testing model E.

(7) The parameter output sub-module outputs the parameter $\theta_2$ of the perturbation generator at the current round.

(8) Execute step (2) for r times. A parameter of the perturbation generator after last training is taken as a final parameter.

(9) When carrying out the attack, the inference module loads the final parameter of the perturbation generator to generate perturbation and superimpose the perturbation onto an original search image to generate an adversarial example in an inference process, thereby deceiving the target tracker.

In this embodiment, in the step (3), "dividing the meta-testing model and the meta-training model" is performed through steps: in each meta-training iteration, randomly selecting, by the training-validation model division sub-module, the one tracker model from the tracker model pool M to construct the meta-testing model E. The remaining tracker models in the tracker model pool M are configured as the meta-training model pool N. Through this division, the mechanism of meta-training and meta-testing is used to assess and improve the generalization ability of the model, and to enhance the adaptability of the models to the new scene.

In this embodiment, in the step (4), a meta-training algorithm by the meta-training sub-module is performed through the following steps.

(2-1) Random sampling combination: the random sampling is performed in the meta-training model pool N to construct the tracker model group S, thereby enhancing diversity and complexity of training models obtained from the initialization module.

(d2) Perturbation generation: a multi-task training is performed on the tracker model group S, and the original search image is transmitted frame by frame to the perturbation generator to generate the adversarial example.

(2-3) Feature map acquisition: the adversarial example and an original example are input into the tracker model group S to obtain a feature map (1) of each of the tracker models in the tracker model group S, and a difference is analyzed between the adversarial example and the original example to deceive the tracker model in the tracker model group S.

The feature map (1) is expressed as:

$$X_t^h, X_t^a \Rightarrow S \Rightarrow \begin{cases} R_s^h, C_s^h = R(X_t^h; \theta), C(X_t^h; \theta), \\ R_s^a, C_s^a = R(X_t^a; \theta), C(X_t^a; \theta), \end{cases} \forall s \in S, t \in T. \quad (1)$$

$$P_s^h = softmax(C_s^h)$$

$$P_s^a = softmax(C_s^a)$$

In the formula (1), t represents/frames of a video stream;

$$X_t^a$$

represents an adversarial example generated after application of adversarial perturbation on frame t; R represents generation of a prediction box boundary; C represents a regression loss of the tracking process;

$$R_s^a$$

and $$R_s^h$$

represent the regression feature maps of the adversarial example and the original example, respectively;

$$C_s^a$$

and $$C_s^h$$

represent classification feature maps of the adversarial example and the original example; and $$P_s^a$$

and $$P_s^h$$

represent probability feature maps transformed by softmax on the classification feature maps which represent the relative confidence that the target occurs at the position.

(2-4) The integrated loss function is calculated and weighted, and backpropagation is applied for model optimization. The adversarial example $$X_t^a$$

and the original example $$X_t^h$$

are respectively taken as input images of the tracker models in the model group S to obtain regression feature maps $$R_s^a$$

and $$R_s^h,$$

classification feature maps and probability feature maps $$P_s^a$$

and $$P_s^h$$

generated by each tracker model. Based on the regression feature maps $$R_s^a$$

and $$R_s^h,$$

classification feature maps $$C_s^a$$

and $$C_s^h$$

and probability feature maps $$P_s^a$$

and $$P_s^h$$

created by softmax, the dual-confidence equilibrium optimization loss function $L_c$ and the peripheral attack regression loss function $L_r$ generated by each tracker model are calculated, and weighted and summed to obtain a combined loss value, and the model parameters of the perturbation generator are updated by backpropagation.

Preferably, in step (4), the training algorithm for the perturbation generator in the meta-training sub-module is as follows.

(3-1) One tracker model is randomly selected from the tracker model pool M as the meta-testing model E $\{M_e\}$. The remaining tracker models in the tracker model pool M are taken as the meta-training model pool N=$\{M_1, M_2, \ldots, M_j, \ldots, M_n\}$ (e≠j).

(3-2) Random sampling is performed in the meta-training model pool N to construct the tracker model group S=$\{(M_a, M_b | M_a, M_b \in F, a \neq b\}$.

(3-3) The perturbation generator G produces a perturbation image P:G(X)⇒P.

(3-4) An adversarial example $$P + X_t^h = X_t^a$$

corresponding to the search region is generated.

(3-5) Based on the formula (1), the adversarial examples, and the original examples, the regression feature maps $$R_s^a$$

and $$R_s^h,$$

the classification feature maps $$C_S^a$$

and $$C_s^h,$$

and the probability feature maps $$P_S^a$$

and $$P_S^h$$

of the each of tracker models in the tracker model group S are generated.

(3-6) The loss function $L_s = \alpha L_1 + \beta L_c + \gamma L_r$, $\forall f \in F$ is calculated.

(3-7) Each loss function is weighted and summed to obtain $$L_{total} = \frac{1}{|s|} \sum_{i=0}^{|s|} L_i.$$

(3-8) The generator parameters $\theta_1$ is updated.

In this embodiment, in the step (4), the dual-confidence equilibrium optimization loss function $L_c$ is expressed as:

$$L_{C_{high}}\left(P_m^a, P_m^h, C_m^a\right) = \tag{2}$$

$$\frac{1}{H} \sum_{H=P_m^h > \delta} \left( \begin{matrix} \lambda_1 BCE(P_m^a[A], zero) \\ \pm \lambda_2 \left(C_m^a[H][:0] - C_m^a[H][:1]\right) \end{matrix} \right) * \left(P_m^h\right)^2;$$

$$L_{C_{blow}}\left(P_m^a, P_m^h, C_m^a\right) = \tag{3}$$

$$\frac{1}{L} \sum_{L=Sort(\vartheta < P_m^h < \zeta)} \left( \begin{matrix} \lambda_3 BCE(P_m^a[L[:1.5H]], one) \\ \pm \lambda_4 \left(C_m^a[L[:1.5H]][:0] - C_m^a[L:1.5H][:1]\right) \end{matrix} \right) *$$

$$\left(P_m^h\right)^2; \text{ and}$$

$$L_c = \lambda_5 * L_{C_{high}} + \lambda_6 * L_{C_{blow}}. \tag{4}$$

In above formulas, three threshold values are set in the dual-confidence equilibrium optimization loss function $L_c$; $\delta$ represents a high confidence threshold; $\zeta$ represents a medium confidence threshold; $\vartheta$ represents a low confidence threshold; m represents a certain tracker; h represents an original example; $\alpha$ represents the adversarial example; P represents the probability feature map generated by softmax on the classification feature map; (represents the classification feature map; BCE represents a binary cross-entropy formula; H represents an index of a confidence region with $$P_m^h > \delta;$$

$\lambda_1$, $\lambda_2$, $\lambda_3$, $\lambda_4$, $\lambda_5$, and $\lambda_6$ represent weights of individual weight coefficients;

$$P_m^h$$

represents a probability feature map generated by an original example transfer tracker m;

$$P_m^a$$

represents a probability feature map generated by an adversarial example transfer tracker m;

$$C_m^a$$

represents a classification feature map generated by the adversarial example transfer tracker m; $L_{C_{high}}$ represents a loss function of a high confidence region; and $L_{C_{blow}}$ represents a loss function of a low confidence region. The high confidence region is greater than $\delta$, generally 0.6. The low confidence region is less than $\delta$, generally 0.1. In order to guide the adversarial attack to target both the high-confidence region and the low-confidence region, the attack strength is effectively enhanced.

(4-2) In an embodiment, two-part function is designed. Firstly, a loss function $L_{C_{high}}$ is defined for regions of higher confidence to reduce the confidence scores within these regions. Correspondingly, a loss function $L_{C_{blow}}$ is defined for regions of lower confidence to enhance the confidence scores. A dual strategy optimizes the effect of the adversarial attack. The loss function $L_{C_{high}}$ uses binary cross-entropy (BCE) to evaluate the difference between the confidence H of regions $$P_m^a$$

higher than $\delta$ and zero, so that the value of the high confidence region is transformed towards zero. A constraint term is added to eliminate the difference between the foreground and background scores of the high confidence region. $L_{C_{blow}}$ makes the value of the low confidence region L tends to be close to 1 and reduces the differentiation of the foreground and background scores. The definition of low confidence intervals is not simply to use all the values less than $\zeta$. The region at the edges is not favourable to attack due to its susceptibility to the Hamming window. The range is therefore limited to a more detailed interval [$\vartheta$, $\zeta$] and sorted to select that greater than 1.5 times H. By balancing the number of high-confidence and low-confidence prediction boxes in this way, the focus is put on the regions that are easy to attack, which in turn enhances the attack ability of the algorithm. At the same time, inspired by the idea of focal loss, the difficulty of the samples is adjusted, and ultimately multiplied by $$P_m^h.$$

The adaptive optimization of the confidence level of each channel, so that the channel with a higher confidence level or channel with a lower confidence level have a greater weight, and the closest region and the region that deviates the farthest from the real target are focused.

In the step (4), the peripheral attack regression loss function $L_r$ is expressed as:

$$L_r\left(R_m^h, R_m^a, P_m^h\right) = \frac{1}{H} \sum_{H=P_m^h > \delta} \lambda_7 giou\left(R_m^h[H], R_m^a[H]\right). \tag{5}$$

In the formula (5), $L_r$ represents the peripheral attack regression loss function; R represents generation of a prediction box boundary;

$$R_m^a$$

represents a prediction box boundary generated by an adversarial example transfer tracker m;

$$R_m^h$$

represents a prediction box boundary generated by an original example transfer tracker m; m represents a certain tracker; h represents an original example; δ represents a high confidence threshold; H represents an index of a confidence region with $$P_m^h > \delta; \lambda_7$$

represents a weight coefficient;

$$P_m^h$$

represents a probability feature map generated by the original example transfer tracker m;

$$R_m^a[H]$$

represents a regression feature map generated by a tracker model in the tracker model pool M after experiencing an adversarial attack within a confidence range of [δ, 1], which reflects a position of a prediction box; and $$R_m^h[H]$$

represents a regression feature map corresponding to a highest confidence determined by the tracker model in the tracker model pool M within an unattacked search region.

(5-1) In the peripheral attack regression loss function $L_r$, R represents generation of prediction box boundaries.

$$R_m^a$$

represents a prediction box boundary generated by the adversarial example transfer tracker m; and $$R_m^h$$

represents a prediction box boundary generated by the original example transfer tracker m. During the tracking process, the intersectionoverUnion (IoU) ratio between the prediction box and the real frame exhibits a low value, which usually indicates that the prediction box at this position is not suitable as the final tracking result. Compared to IoU, GeneralizedIoU (GIoU) has a more significant improvement. Even when the prediction box is completely off-target, GIOU is still able to effectively measure the offset gap between the prediction box and the real target. As the relative distance between the prediction box and the real target increases, the GIOU value increases accordingly, which can guide the tracker prediction results away from the actual target position. In this disclosure, H represents the index of the confidence region with $$P_m^h > \delta;$$

$\lambda_7$ represents the weight coefficient; δ represents the high confidence threshold;

$$R_m^a[H]$$

represents the regression feature map generated by the tracker model in the tracker model pool M after experiencing the adversarial attack within the confidence range of [δ, 1], which reflects the position of the prediction box. Instead, $$R_m^h[H]$$

represents the regression feature map corresponding to the highest confidence determined by the tracker model in the tracker model pool M within the unattacked search region. This treatment may cause the prediction box to be significantly shifted or even reduced, such that in the following frames, the search region may no longer contain the position of the real target, thereby purposefully generating adversarial examples, effectively disrupting the performance of the tracker, and enhancing the vulnerability of the tracker when faced with adversarial perturbations.

In the step (6), the algorithm for performance validation and evaluation is performed through the following steps.

(6-1) Performance validation and evaluation. The meta-training strategy will be applied to the performance validation and evaluation sub-module. The adversarial example $$X_t^a$$

and the original example $$X_t^h$$

are input to the meta-testing model E to obtain the feature map (6) to test generalization ability to of the perturbation generator for tracker models in the meta-testing model E, and to evaluate and guide an optimization direction of the perturbation generator.

The feature map (6) is expressed as:

$$X_t^h, X_t^a \Rightarrow E \Rightarrow \begin{cases} R_e^h, C_e^h = R(X_t^h; \theta), C(X_t^h; \theta), \\ R_e^a, C_e^a = R(X_t^a; \theta), C(X_t^a; \theta), \end{cases} \forall e \in E, \ t \in T. \quad (6)$$

$$P_e^h = softmax(C_s^h)$$

$$P_e^a = softmax(C_s^a)$$

In the formula (6), t represents t frames of the video stream;

$$X_t^a$$

represents the adversarial example; R represents a classification loss of a tracking process; C represents a regression loss of the tracking process;

$$R_e^a$$

and $$R_e^h$$

represent the regression feature map of the adversarial example and the original example, respectively;

$$C_e^a$$

and $$C_e^h$$

represent the classification feature map of the adversarial example and the original example;

$$P_e^a$$

and $$P_e^h$$

represent the probability feature map transformed by the softmax of the classification feature map which represents the relative confidence that the target occurs at the position. Note: e and s as subscripts represent tracker models in the meta-testing model E and the tracker model group S, respectively.

In the step (4), the training algorithm for the perturbation generator in the meta-training module is performed through the following steps.

(7-1) The perturbation generator G generates a perturbation image $P:G(X_t) \Rightarrow P$.

(7-2) The adversarial example $$P + X_t^h = X_t^a$$

corresponding to the search region is generated.

(7-3) Based on the formula (6), the adversarial example is input into the meta-testing model E to generate the classification feature map and the corresponding probability feature map.

(7-4) The loss function $L_e = \alpha L_1 + \beta L_c + \gamma L_R$, $\forall e \in E$ is calculated.

(7-5) The generator parameters θ2 of the perturbation generator is updated.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. An adaptive meta-attack method for a target tracker under an autonomous driving scenario using an adaptive meta-attack system, the adaptive meta-attack system comprising:

an initialization module;

a meta-training iteration module;

a meta-testing module;

a perturbation generator; and an inference module;

wherein the initialization module comprises a model initialization sub-module and a parameter initialization sub-module; the model initialization sub-module is configured to perform model initialization, and the parameter initialization sub-module is configured to perform parameter initialization;

the meta-training iteration module comprises a video input sub-module, a training-validation model division sub-module, and a meta-training sub-module;

the meta-testing module comprises a performance validation and evaluation sub-module and a parameter output sub-module;

the meta-training iteration module is configured to train the perturbation generator through multiple iterations by using a video dataset input by the video input sub-module to obtain a trained perturbation generator;

the meta-testing module is configured to perform performance validation and evaluation on the trained perturbation generator; and the inference module is configured to attack a video by using the trained perturbation generator;

the adaptive meta-attack method comprising:

(a) constructing, by the model initialization sub-module, a tracker model pool M={M1, M2 . . . , Mn} with a diversified network structure; initializing, by the model initialization sub-module, the tracker model pool; and performing, by the parameter initialization sub-module, parameter initialization of the perturbation generator; wherein the tracker model pool Mis configured to construct a meta-training model pool N and a meta-testing model E to make the perturbation generator adaptive to different trackers; and a parameter of the perturbation generator is 0 output from a previous training process; and random parameters are used in a first training;

(b) extracting, by the video input sub-module, a video from the video dataset for sampling, and extracting 1 frame from every 10 frames to constitute a training image for a current round;

(c) randomly selecting, by the training-validation model division sub-module, one tracker model from the tracker model pool M to construct the meta-testing model E; wherein remaining tracker models in the tracker model pool M are configured as the meta-training model pool N;

(d) performing, by the meta-training sub-module, random sampling in the meta-training model pool N to construct a tracker model group S; inputting a search region into the perturbation generator to generate a first adversarial example; and computing a dual-confidence balance optimization loss function $L_c$ and a peripheral attack regression loss function $L_r$ generated by each of tracker models in the tracker model group S; and performing weighted ensemble on the dual-confidence balance optimization loss function $L_c$ and the peripheral attack regression loss function $L_r$, and performing model optimization on the perturbation generator by back propagation;

(e) repeating step (d) φ times, and outputting a parameter $\theta_1$;

(f) performing performance test, by the performance validation and evaluation sub-module, on the perturbation generator trained each time by the meta-training sub-module, wherein a tracker model used by the performance validation and evaluation sub-module is the meta-testing model E;

(g) outputting, by the parameter output sub-module, a parameter $\theta_2$ of the perturbation generator in the current round;

(h) executing step (b), and repeating training for t times; and taking a parameter of the perturbation generator after last training as a final parameter; and (i) loading, by the inference module, the final parameter of the perturbation generator to generate perturbation and superimpose the perturbation onto an original search image to generate a second adversarial example, thereby deceiving the target tracker.

2. The adaptive meta-attack method of claim 1, wherein in the step (d), a meta-training algorithm is performed by the meta-training sub-module through the following steps:

(d1) performing the random sampling in the meta-training model pool N to construct the tracker model group S;

(d2) performing a multi-task training on the tracker model group S; and transmitting the original search image frame by frame to the perturbation generator to generate the first adversarial example;

(d3) inputting the first adversarial example and an original example into the tracker model group S to obtain a feature map of each of the tracker models in the tracker model group S, and analyzing a difference between the first adversarial example and the original example and deceiving the tracker models in the tracker model group S; and (d4) taking the first adversarial example and the original example respectively as input images of the tracker models in the tracker model group S to obtain a regression feature map generated by each of the tracker models; calculating, based on the regression feature map, a classification feature map and a probability feature map created by softmax, the dual-confidence balance optimization loss function $L_c$ and the peripheral attack regression loss function $L_r$; and weighting and summing the dual-confidence balance optimization loss function $L_c$ and the peripheral attack regression loss function $L_r$ to obtain a combined loss, and updating model parameters of the perturbation generator by back propagation.

3. The adaptive meta-attack method of claim 1, wherein in the step (d), a training algorithm for the perturbation generator in the meta-training sub-module is performed through the following steps:

(d-1) randomly selecting the one tracker model from the tracker model pool M as the meta-testing model E, and taking the remaining tracker models in the tracker model pool M as the meta-training model pool N; and performing the random sampling in the meta-training model pool N to construct the tracker model group S;

(d-2) producing, by a perturbation generator G, a perturbation image P; generating the first adversarial example corresponding to the search region; based on the first adversarial example and an original example, generating regression feature maps, classification feature maps and probability feature maps respectively of each of the tracker models; computing the dual-confidence balance optimization loss function $L_c$ and the peripheral attack regression loss function $L_r$, and weighting and summing the dual-confidence balance optimization loss function $L_c$ and the peripheral attack regression loss function $L_r$; and (d-3) performing parameter updating on the perturbation generator.

4. The adaptive meta-attack method of claim 1, wherein in the step (d), the dual-confidence balance optimization loss function $L_c$ is expressed as:

$$L_{C_{high}}\left(P_m^a, P_m^h, C_m^a\right) = \tag{1}$$

$$\frac{1}{H}\sum\nolimits_{H=P_m^h>\delta}\left(\begin{array}{c}\lambda_1 BCE(P_m^a[A], \text{zero}) \\ \pm\lambda_2\left(C_m^a[H][:0] - C_m^a[H][:1]\right)\end{array}\right)*\left(P_m^h\right)^2$$

$$L_{C_{blow}}\left(P_m^a, P_m^h, C_m^a\right) = \tag{2}$$

$$\frac{1}{L}\sum\nolimits_{L=Sort(\vartheta<P_m^h<\zeta)}\left(\begin{array}{c}\lambda_3 BCE\left(P_m^a\left[L[:1.5H]\right], \text{one}\right) \\ \pm\lambda_4\left(C_m^a\left[L[:1.5H]\right][:0] - C_m^a\left[L:1.5H\right][:1]\right)\end{array}\right)*$$
$$\left(P_m^h\right)^2;$$

$$L_c = \lambda_5 * L_{C_{high}} + \lambda_6 * L_{C_{blow}}; \tag{3}$$

wherein δ represents a high confidence threshold; ζ represents a medium confidence threshold; Θ represents a low confidence threshold; m represents a certain tracker; h represents an original example; a represents the adversarial example; P represents a probability feature map generated by softmax on a classification feature map; C represents the classification feature map; BCE represents a binary cross-entropy formula; H represents an index of a confidence region with $$P_m^h > \delta;$$

$\lambda_1, \lambda_2, \lambda_3, \lambda_4, \lambda_5,$ and $\lambda_6$ represent weights of individual weight coefficients;

$$P_m^h$$

represents a probability feature map generated by an original example transfer tracker m;

$$P_m^a$$

represents a probability feature map generated by an adversarial example transfer tracker m;

$$C_m^a$$

represents a classification feature map generated by the adversarial example transfer tracker m; $L_{C_{high}}$ represents a loss function of a high confidence region which is greater than the $\delta$; and $L_{C_{low}}$ represents a loss function of a low confidence region which is lower than the $\delta$.

5. The adaptive meta-attack method of claim 1, wherein in the step (d), the peripheral attack regression loss function $L_r$ is expressed as:

$$L_r\left(R_m^h, R_m^a, P_m^h\right) = \frac{1}{H}\sum\nolimits_{H=P_m^h>\delta} \lambda_7 giou\left(R_m^h[H], R_m^a[H]\right); \tag{1}$$

wherein $L_r$ represents the peripheral attack regression loss function; R represents generation of a prediction box boundary;

$$R_m^a$$

represents a prediction box boundary generated by an adversarial example transfer tracker m;

$$R_m^h$$

represents a prediction box boundary generated by an original example transfer tracker m; m represents a certain tracker; h represents an original example; $\delta$ represents a high confidence threshold; H represents an index of a confidence region with $$P_m^h > \delta;$$

represents a weight coefficient;

$$P_m^h$$

represents a probability feature map generated by the original example transfer tracker m;

$$R_m^a[H]$$

represents a regression feature map generated by a tracker model in the tracker model pool M in a meta-training phase after experiencing an adversarial attack within a confidence range of [$\delta$, 1], which reflects a position of a prediction box; and $$R_m^h[H]$$

represents a regression feature map corresponding to a highest confidence determined by the tracker model in the tracker model pool M within an unattacked search region.

6. The adaptive meta-attack method of claim 1, wherein in the step (f), an algorithm for performance validation and evaluation is performed through the following steps:
applying a meta-training strategy in a meta-training phase to the performance validation and evaluation sub-module; inputting the first adversarial example and the original example to the meta-testing model E to obtain a regression feature map, a classification feature map, and a probability feature map to test generalization ability of the perturbation generator for tracker models in the meta-testing model E, and to evaluate and guide an optimization direction of the perturbation generator.

7. The adaptive meta-attack method of claim 1, wherein in the step (d), an algorithm for the perturbation generator in the meta-training module is performed through the following steps:
generating a perturbation image by the perturbation generator G; generating the first adversarial example corresponding to the search region; inputting the first adversarial example into the meta-testing model E to generate a classification feature map and a probability feature map; calculating the dual-confidence balance optimization loss function $L_c$ and the peripheral attack regression loss function $L_r$; and performing parameter updating on the perturbation generator.

\* \* \* \* \*